United States Patent Office 2,942,967
Patented June 28, 1960

2,942,967

PRODUCTION OF A CALCIUM PHOSPHATE FERTILIZER WITH REDUCED HYGROSCOPICITY

Paul Caldwell, Evergreen Park, Ill., assignor of one-half to Donald W. Lloyd, Chicago, Ill.

Filed May 20, 1957, Ser. No. 660,329

10 Claims. (Cl. 71—39)

The present invention relates generally to an improved phosphate-containing product particularly useful as a fertilizer or plant food. More specifically, the present invention is directed to the formation of an improved plant food product which is substantially non-hygroscopic and which may exhibit substantially increased water solubility if desired, the manner in which the product is formed being particularly useful in the obtaining of a substantially pure plant food which can be readily formulated to contain a relatively high number of basic nitrogen, phosphate and potash units present on an equal weight ratio basis.

In connection with the utilization of inorganic nitrogenous acid digestion of phosphate rock in the manufacture of plant foods, advances have been made in the elimination of fluorine components of the rock and the formation of a citrate-soluble phosphate product. With these advances the nitric acid digestion procedure has approached a stage of development wherein it exhibits substantial possibilities of widespread commercial use to replace the more common digestion procedures using sulfuric acid. With the ready availability of nitric acid as compared with the variable availability and/or expense involved in the use of sulfuric acid, efforts have been made to improve the nitric acid digestion procedures to an extent that a product suitable for variable uses can readily be formed.

In connection with the many different uses of plant foods each of which requires certain physical or chemical properties which are of a variable nature, it has been found that the nitric acid treatment of phosphate rock as heretofore known and practiced is incapable of meeting the variable end product requirements. The reduction of hygroscopicity in the plant food end product is of particular importance and presents a problem which, although long recognized, has not been adequately solved in connection with commercial production. Not only has hygroscopicity been an important drawback in the variable use of plant foods formed by nitric acid digestion, but the water solubility of the end product has often been found inadequate under certain conditions of use.

It is an object of the present invention to provide an improved inorganic nitrogenous acid digestion treatment of phosphate rock which retains the advantages residing in known methods of treatment while providing further improvements in the plant food end product in the form of at least substantially reduced hygroscopicity and increased water solubility where desired.

Still a further object, and one of particular importance in connection with the present invention, is the provision of a phosphate-containing plant food product by inorganic nitrogenous acid digestion treatment of phosphate rock wherein the product is substantially purified during and/or following economic commercial formation and treatment of the same to provide for a basic equal weight ratio of available nitrogen, phosphate and potash components to allow ready and economical formulation of the same into an end product of increased total weight of plant food units which total weight is above that previously attainable on a commercial basis.

Still a further object is to provide an improved nitric acid digestion treatment of phosphate rock capable of ready variation in the provision of different plant food products exhibiting variable physical and chemical properties to meet the different needs of the industry, in each instance the variations in the physical and chemical properties of the plant food products being attained without loss or diminution of the basically required properties such as freedom from fluorine contaminants and the presence of adequate citrate-solubility of the phosphate component.

Other objects not specifically set forth will become apparent from the following detailed description made in conjunction with the drawings wherein.

Figure 1:
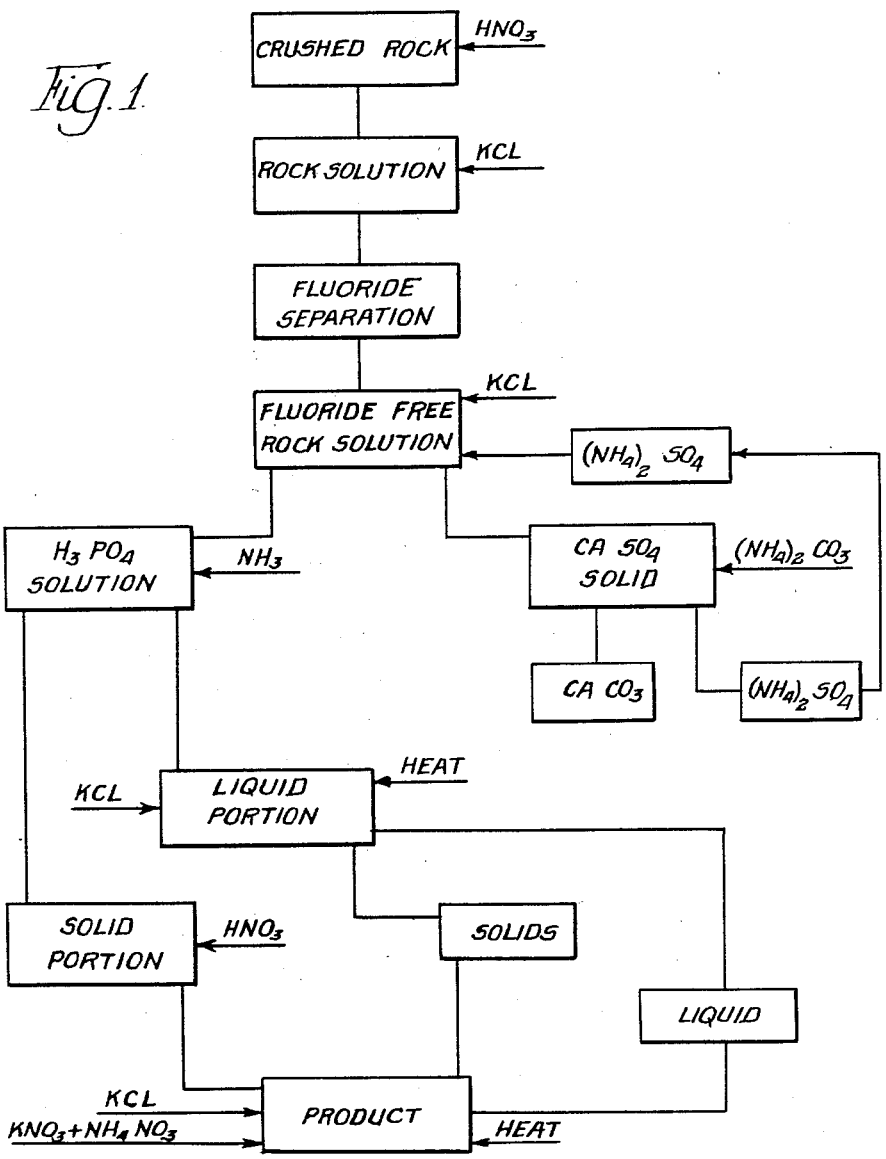
Fig. 1 is a diagrammatic flow sheet of different methods of treatment incorporating the principles of the present invention.

The digestion of phosphate rock with an inorganic nitrogenous acid, such as nitric acid, includes certain initial basic steps in carrying out the variable method of the present invention. Any suitable phosphorous-containing rock is ground to the desired degree for efficient digestion during the acid treatment. In this connection satisfactory results can be obtained with rock ground to a fineness such that 80 to 90% of the same will pass through a 60 mesh screen (Tyler standard). The rock, of course, may be more finely ground within the economic limits of the particular process followed. The rock may also be calcined prior to digestion in order to char organic matter and carbonates present therein. Such charring will reduce foaming developed during the digestion operation. If calcination is used, the temperature of this particular step should be maintained below that at which lime and silica present in the rock combine to form calcium silicate which interferes with the filtration operation following digestion of the rock.

The crushed or ground rock may be acid treated in continuous or batch-type methods depending upon the equipment available. If a batch digestion procedure is followed, a super-saturation of rock is preferably provided by using 50% excess rock in a given amount of acid to make full use of the hydrogen ion made available by the acid. Additional acid can then be added to place in solution all of the phosphatic value of the rock followed by removal of the insoluble material by decantation or use of other suitable separation procedures. Additional rock is then added to again fully utilize the available hydrogen ions of the acid and the batch operation is continued until full utilization of the nitric acid is obtained. Any suitable procedure for removing the phosphatic value of the rock by the nitric acid can be followed and this initial step is diagrammatically set forth in Figs. 1 and 2 of the drawings. Upon the obtaining of an acid solution including the solubilized rock components therein which consist primarily of phosphorous, calcium and fluorine components, the acid solution is centrifuged as, for example, in an imperforate basket-type centrifuge to remove at least substantially all of the entrained insoluble matter such as clay. The acid solution is then made perfectly clear by use of a polishing filter of known type.

The digesting agent used in the practice of the present invention comprises inorganic nitrogenous acids such as nitric acid or the acid or acid mixtures obtained by the passage of gaseous nitrogen oxides through an aqueous medium. The nitrogenous acid agent may comprise nitric acid obtained from a commercial source or may comprise nitrogenous acids produced at the site of the digestion operation. The nitrogenous digestion agent in concentration may range from dilute to highly concentrated forms, the dilute solutions requiring more prolonged digestion periods than the concentrated solutions. The use of the digestion agent, such as nitric acid, can be varied considerably and temperature control of the digestion reaction will depend on the concentration of acid used and the speed of reaction desired. While the nitric acid will generally be more expensive than the phosphate rock, it is preferable to obtain a balance between the degree of utilization of acid and the degree of recovery of the phosphatic component of the rock. The balance is determined upon economic grounds, the residual unused portions of rock and acid being subsequently utilized with fresh charges for further recovery of the important components thereof.

In the acid solution formed there is contained the acid-soluble fluorine component of the rock which must be at least substantially removed pursuant to known practices. The fluorine component will be present in the form of a fluoro-silicate and in order to remove this component from the acid solution, potassium chlorine is added to form potassium silico-fluoride which precipitates from the solution and may be readily separated by filtering. With the necessity of adding potassium chloride at this stage of the process to remove the fluorine component, it is preferable to determine the phosphatic value of the acid solution as well as the fluorine component concentration to determine the amount of potassium chloride necessary to provide a 1 to 1 ratio of potash to phosphate on a weight percentage basis. A sample of the acid solution is analyzed for this purpose and the total amount of potassium chloride necessary to provide the equal weight basis of potash is calculated. To this calculated amount, an additional amount of approximately 10% of the total calculated amount is further used for reaction with the fluorine component of the solution, this additional amount being withdrawn from the process with the fluoride.

In order to prevent the formation of a complex fluoride compound and thus prevent any substantial loss of phosphatic or nitrogen value, the potassium chloride is preferably added in stages. Preferably only one-half of the total potassium chloride to be added is combined with the acid solution at this stage of the process, this initial half quantity of potassium chloride being increased by the additional 10% of the total quantity to be combined and lost with the fluorine component. Following separation of the potassium silico-fluoride precipitate, the remainder of the calculated potassium chloride is added to the acid solution in preparation for ammoniation thereof.

Control of the hygroscopicity of the final product can be commenced by the removal of calcium from the solution to reduce the formation of hygroscopic salts which are carried over with the phosphate value or subsequently recombined therewith in forming the final product. Careful control of hygroscopicity of the plant food product is of particular importance in connection with effective handling and use of the product in its dried condition. The problem of hygroscopicity has long been recognized and it has been generally considered that nitric acid digestion of phosphate rock results in increased hygroscopicity thus providing a less desirable product. The presence of hygroscopic salts in the final product, of course, materially affects the over-all hygroscopicity of the product and while the desirability of salt removal has been recognized, there has been no commercially suitable procedure developed whereby these salts may be either readily converted to less hygroscopic compounds or substantially removed to an extent that the ultimate hygroscopicity of the product is adequate for widespread use under variable climatic conditions.

The presence of certain nitrate and chloride salts in the final product will materially increase the hygroscopicity of the product. It has been generally recognized that calcium nitrate is highly hygroscopic and the general undesirable degree of hygroscopicity present in nitric acid formed plant foods has largely been attributed to the presence of calcium nitrate. However, in line with the principles of the present invention the presence of additional salts, such as calcium chloride, has been found to materially add to the hygroscopic nature of the final product and the particularly hygroscopic chloride and nitrate salts must preferably be converted or removed in order to provide a suitable end product. In line with the teachings of the present invention, it is a purpose to convert or reduce the amount of calcium salts present in the final product in order to provide a product which is substantially less hygroscopic in nature to an extent that it is entirely commercially acceptable even when used under variable climatic conditions.

Following the addition of the potassium chloride to the extent of the full calculated amount, the control of hygroscopicity can be accomplished in accordance with one form of treatment as shown in Fig. 1 by sulfating the fluoride-free rock solution. While any soluble sulfate, such as sodium sulfate or potassium sulfate, can be used, it is preferred from an economical standpoint to utilize ammonium sulfate, this particular sulfating agent not only being economically preferred but further being more efficient from the standpoint of eliminating the presence of hygroscopic salts. The treatment set forth in Fig. 1 can include the addition of sufficient ammonium sulfate to precipitate adequate calcium in the form of calcium sulfate solids to reduce the calcium-phosphate ratio to that which favors formation of dicalcium phosphate. Substantially all of the calcium above the dicalcium phosphate ratio is precipitated in the form of calcium sulfate and the solid calcium sulfate precipitate is removed by filtering or any other suitable means from the rock solution. The calcium sulfate removed can then be treated with ammonium carbonate to form ammonium sulfate for subsequent reuse and chalk (calcium carbonate) as a by-product.

The rock solution resulting from the sulfating treatment will consist primarily of phosphoric acid, calcium nitrate, calcium chloride and potassium nitrate, the calcium salts being substantially reduced in concentration by the sulfating step. This solution may then be ammoniated to a pH of approximately 7 whereupon dicalcium and monocalcium phosphate precipitates and is readily separated by filtering. The solid portion will predominate in dicalcium phosphate under the conditions set forth. The liquid portion consists primarily of ammonium chloride, ammonium nitrate, and potassium nitrate.

With the particular treatment described to this point, the phosphate solids obtained by ammoniation are of relatively high purity and do not contain an appreciable concentration of diluents in the form of co-precipitated solids. The presence of soluble salts which do not contribute to the fertilizer value as well as other undesirable diluents in phosphatic products obtained from the digestion of phosphate rock with nitric acid has made it commercially impractical to obtain an end product plant food having equal weight ratios of nitrogen, phosphate and potash which in a given quantity upon formulation can include a high number of plant food units adequate to provide a 15-15-15 weight ratio. The presence of the undesirable diluents not only adds to the hygroscopicity of the final product but has been found to limit commercial products to total plant food unit ratios of 12-12-12 or less. For this reason, nitric acid digestion of phosphate rock has not been found commercially acceptable where it is desired to prepare variable plant food products for different uses.

In completing the treatment set forth in Fig. 1, the salt containing liquid portion is concentrated in any suitable manner, such as by the application of heat, to remove therefrom the potash and nitrogen value-supplying salts which are of a less hygroscopic nature. The solubility of the nitrates forming a substantial part of the salt solution increases with temperature elevation at a faster rate than that of the chloride. The first crop of crystals obtained from the solution will tend to be high in nitrates and the mother liquor will increase in ammonium chloride concentration. By separating the first crop of crystals by filtering or some other suitable means to secure a mother liquor high in ammonium chloride and low in potash, it is possible to obtain substantial separation of the components from which the plant food ingredients are obtained. With the separated potash and nitrogen-supplying mother liquor, recombining of the various ingredients with the solid phosphate can be readily obtained on a commercial basis to provide a substantially non-hygroscopic product relatively free of diluents to allow incorporation therein of high weight plant food values on an equal rate ratio basis which will provide a final product of a grade higher than 12–12–12. Thus, upon proper analysis of the precipitated salts and remaining mother liquor, given quantities of each may be added to the dicalcium phosphate solids to provide a basic 1–1–1 product. The product can then be suitably dried and will be found to be substantially non-hygroscopic while in addition containing a substantially increased number of plant food units to provide for increased food value on the order of a 15–15–15 mix if desired.

The composition of the final product can be controlled to any desired degree as all of the important ingredients thereof are completely separated during the process. The basis of addition of the concentrated liquor high in ammonium chloride and the potassium nitrate and ammonium nitrate solids with the undried phosphate solids is calculated to provide the desired final product after which the recombined slurry is dried.

In addition to the treatment outlined for the purpose of obtaining a highly concentrated product which is substantially non-hygroscopic, the solid phosphate portion may be acid treated to increase the water solubility thereof. Any suitable acid can be used to increase the water solubility of the phosphate solids but for economical purposes nitric acid is preferred. Sufficient nitric acid is added to the phosphate solids prior to recombining of the various components to lower the pH and adjust the phosphate to the extent of water solubility desired. The pH of the acid treated solids is adjusted, for example, to approximately 3 to provide an increased water solubility. Following acid treatment for this purpose, the various separated components are recombined in the manner previously described. The extent to which the water solubility is increased will depend largely upon the extent to which the dicalcium phosphate is dissolved in the nitric acid added. If a substantial portion of the dicalcium phosphate is put into solution, the water solubility will be substantially increased.

The following is an illustrative example of the particular process set forth above.

Example I

An acid rock solution was formed by treating crushed rock with nitric acid in the known manner. A liter of filtered rock solution containing 100 gm. of $P_2O_5$, 58 gm. of nitrogen in the nitrate form and 139 gm. of CaO was calculated for mole-to-mole reaction of the nitrogen with 254 gm. of KCl and an additional amount of approximately 8.3 gm. of KCl was calculated for reaction with 10 gm. of fluorine present in the rock solution. Half of the calculated KCl was added for the primary purpose of removing the fluorine and preventing the formation of a complex silico-fluoride salt. The portion of KCl added was determined to be free from insoluble material in order to prevent suppression of precipitation of the fluorine or contamination of the potassium silico-fluoride formed. The fluoride salt was removed by filtering from the acid solution and the remaining calculated quantity of KCl was added thereto. 122 gm. of ammonium sulfate was added to remove 60 gm. of CaO to leave 79 gm. of CaO to favor the formation of dicalcium phosphate. The calcium nitrate present in the solution combined with the ammonium sulfate to form calcium sulfate and ammonium nitrate, the calcium sulfate being removed in the form of a solid. The ammonium sulfate was added in the form of a solution following the preferred procedure. The phosphate solution was ammoniated to a pH of 7 and the resulting slurry was separated with the solids being washed to remove most of the nitrogen and potash values entrained therein as well as substantially remove all of any calcium chloride passing over therewith. The solid portion was analyzed and found to contain 16.9% $P_2O_5$ with slight traces of nitrogen and potash. The liquid portion after concentration by evaporation was found to contain 13.56% nitrogen, 11.35% potash and 0.13% phosphate. The phosphate containing solid portion was then made into a slurry and the pH of the same was adjusted to 3 by adding nitric acid. Upon analysis this slurry contained 3.66% nitrogen, 7.20% phosphate and 0.57% potash. 100 parts of the slurry high in phosphatic value were added with 26.2 parts of the liquid portion. To this slurry 5.9 parts of KCl calculated to provide 62.5% potash was added resulting in a 1–1–1 ratio of plant food units which on a part by weight basis gave 7.20 parts nitrogen, 7.23 parts phosphate and 7.05 parts potash. The recombined mixture was dried and upon analysis found to contain 13.0% nitrogen, 16.2% phosphate (29.6% of it being water soluble and 0.2% of it being citrate insoluble) and 15.81% potash. Upon blending, a substantially 15–15–15 plant food product was obtained.

In considering the foregoing example it will be noted that very little phosphatic value remained in the liquid portion following ammoniation and thus substantially complete separation was obtained following adjustment of the calcium-phosphate ratio by the use of ammonium sulfate. Variations in the foregoing process can be utilized in connection with the addition of potassium chloride wherein sufficient potassium chloride can be added before ammoniation, or after ammoniation if preferred, to convert at least substantially all of the ammonia nitrate to potassium nitrate. Subsequent separation of the first crop of crystals upon concentration of the liquid portion will result in a mother liquor high in ammonium chloride and low in potash as illustrated. Complete control can be had by complete separation of the various components to allow subsequent formulation of the finished product to provide a commercial form containing plant food unit ratios of increased total weight. As illustrated in the example, substantial removal of the potash from the mother liquor by concentration may result in the necessity of adding further potassium chloride during the recombining of the ingredients to form the final product prior to drying the same. Additional potassium chloride may be necessary to bring the ratio of plant foods to 1–1–1 insofar as the potash value of the same is concerned. The additional potassium chloride added will further combine with some or all of the calcium nitrate formed upon the re-dissolving of the dicalcium phosphate during acid treatment of the same to convert the calcium nitrate to calcium chloride and potassium nitrate thus providing salts of less hygroscopicity. Where acid treatment is used to increase the water solubility of the phosphate, it is preferable to subsequently add fresh potassium chloride when the components of the process are recombined to convert the hygroscopic salts formed during acid treatment into salts of substantially reduced hygroscopicity.

While the foregoing has been described in connection with adding fresh potassium chloride to the recombined product prior to drying to increase the potash ratio thereof, it should be noted that the crystal fraction of the liquid portion which is high in potassium nitrate and ammonium nitrate can also be used for recombining with the acid treated phosphate and ammonium chloride liquor. The potassium nitrate and ammonium nitrate crystal fraction can provide the calculated potash necessary to upgrade the final product. Thus, the flow sheet of Fig. 1 illustrates the introduction of potassium chloride and/or potassium nitrate plus ammonium nitrate during the recombining step to form the final product.

The acid treatment of the phosphate solids should preferably be controlled to prevent complete breaking down of the dicalcium phosphate to monocalcium phosphate which is completely water soluble. The purpose of the acid treatment is merely to increase the water solubility of the final product to the extent desired while taking into consideration the extent to which additional calcium is made available by acid treatment to combine with other components to increase the hygroscopicity of the final product. The process described is preferably carried out in a manner to control utilization of the calcium ion to prevent the final product from being substantially hygroscopic. Increasing water solubility may often be of secondary importance. Substantially complete separation of the important components making up the final product results in full control over component utilization to not only reduce hygroscopicity of the final product but also allow formulation of high equal weight products of the 15–15–15 type.

Any suitable drying procedure can be followed in finishing the recombined product. Preferably a seed bed method of recycling a substantial portion of the dry product for addition to the newly formed wet crystals is preferred. Such a method substantially reduces the drying requirements as compared with the capacity necessary in connection with the use of conventional forms of drying chamber units.

In connection with the treatment outlined in Fig. 1, variations of the same can be used to provide an end product of improved composition and physical properties. As previously described, the removal of the calcium ion can be carried out to an extent that the calcium-phosphate ratio is reduced to substantially that of dicalcium phosphate. The calcium removal need not be so extensive as that described if the presence of a phosphate component of increased water solubility is of secondary importance and the primary concern is that of controlling hygroscopicity of the final product. In this event the calcium removal is preferably carried out to an extent that the formation of pentacalcium phosphate, $Ca_5H_2(PO_4)_4$, is favored and controlled so that at least practically no calcium is available to form calcium chloride. The ammonium chloride which would result under these circumstances is not very hygroscopic and the hygroscopicity of the final product would be considerably reduced.

Under the last mentioned conditions, the sulfating agent would be added to an extent that the calcium-phosphate ratio would be reduced to that of pentacalcium phosphate. Substantially no calcium chloride would be formed to be carried over upon ammoniation with the phosphate solids. The ammonium chloride content of the mother liquor, as previously described, would be substantially increased and this salt in and of itself is relatively non-hygroscopic. By appropriate modifications of the above discussed procedures, removal of ammonium nitrate and potassium nitrate from the mother liquor can be obtained and the remaining predominantly ammonium chloride solution can then be recombined with the phosphate solids to provide a final product of reduced hygroscopicity. Under these circumstances the necessary additional potash value added to the final product prior to drying the same would be supplied by fresh potassium chloride without the crystal fraction of the liquid portion being used. In this manner it is possible to remove all of the ammonium nitrate to provide a product which will be entirely non-hygroscopic under any normal climatic conditions.

The following example illustrates the modified procedure discussed above.

Example II 500 ml. of a phosphate solution formed by treating 30% nitric acid with an excess of calcined phosphate rock was clarified. The 500 ml. portion contained 53.4 gm. $P_2O_5$ and 74 gm. CaO. The 42.2 gm. KCl was added to the solution at about 70° C. The solution was cooled to about 25° C. and filtered to remove the potassium silicofluoride. An additional quantity of 42.2 gm. KCl was then added in line with the standard procedure set forth above. A saturated solution of ammonium sulfate containing 48.5 gm. of the sulfate was added to the filtrate and the calcium sulfate formed was removed by filtering and washing. The calcium removed on the basis calculated reduced the calcium-phosphate ratio to encourage the formation of pentacalcium phosphate. The filtrate following calcium sulfate removal was then ammoniated to a pH of 5 and the resulting slurry was dried. The analysis of the dried product was:

| | Percent |
|---|---|
| N | 16.4 |
| $P_2O_5$ | 14.1 |
| $K_2O$ | 12.2 |

The foregoing example provides a plant food product of substantially reduced hygroscopicity in line with the above described modified process. It will be noted that the example does not include the recombining of the various ingredients to provide a finished 1–1–1 ratio of components. This of course can be carried out in conjunction with the procedure set forth in Example I, and Example II merely illustrates the formation of pentacalcium phosphate with the required amount of ammonium sulfate being added to properly reduce the calcium-phosphate ratio as described. The pentacalcium phosphate formed should preferably not be washed as this tends to break down the phosphate and provide available calcium for formation of undesirable hygroscopic salts. The ammoniation will preferably be carried out to a pH of 5 instead of a pH of 7 as the latter tends to form tricalcium phosphate under the conditions outlined.

Acid treatment for the purpose of increasing the water solubility of the phosphate component should preferably not be utilized in forming a product of reduced hygroscopicity by favoring the formation of pentacalcium phosphate. Acid treatment tends to break down the phosphate compound toward the dicalcium and monocalcium level and, consequently, acid treatment would defeat the purpose of reducing hygroscopicity. The solid calcium sulfate formed will be converted to ammonium sulfate and chalk in the same manner as previously described.

Figure 2:
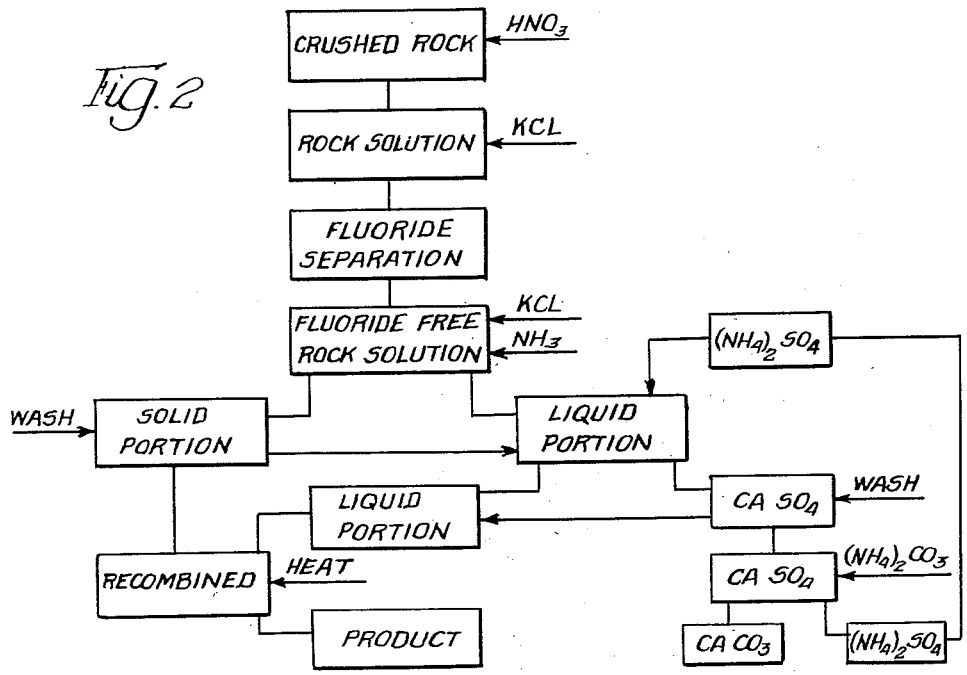
Fig. 2 is a diagrammatic flow sheet illustrating a further modified treatment.

Still another procedure which can be followed in line with the principles of the present invention to provide an end product of reduced hygroscopicity is shown in Fig. 2. The nitric acid digestion of the phosphate rock and potassium chloride treatment thereof with accompanying fluoride separation is carried out in the same manner as previously described. Ammoniation of the fluoride free rock solution immediately follows the preliminary treatment steps without having first subjected the rock solution to the calcium removal action of a sulfating agent. Ammoniation may be carried out to an extent wherein the pH of the solution is raised to between 4 and 7 and the solids rich in phosphate formed thereby are separated from the remaining liquid portion. Substantially all of the so-called "free" calcium which is uncombined with the phosphate remains in the liquid portion. The calcium may then be removed therefrom by treatment with ammonium sulfate in the manner previously described, the calcium sulfate formed being separated and subsequently treated with ammonium carbonate to convert the same into ammonium sulfate for recycling purposes and a by-product of calcium carbonate. The "free" calcium may be removed to any extent desired depending on the amount of ammonium sulfate added to the liquid portion.

The solid portion resulting from ammoniation and rich in the calcium phosphate solids can also be washed to further remove any available calcium therefrom, the washed liquor being added to the liquid portion prior to sulfating thereof. As a result of this modified form of treatment, all of the soluble calcium can be precipitated in the form of calcium sulfate and thus removed from the components used to form the final product during the recombining step. If any calcium remains to any appreciable extent, there will be enough sulfate ions available so that upon concentration of the liquid portion subsequent to the recombining step, the calcium present will be in the form of a non-hygroscopic sulfate rather than the relatively hygroscopic chloride. In this connection the solid calcium sulfate precipitated as a result of the sulfating treatment can also be washed to remove the soluble ammonium sulfate therefrom for purposes of returning the same to the liquid portion for subsequent recombining.

By following one or more of the various steps outlined in Fig. 2, calcium removal can be carried out to any extent desired. The resulting salt-containing liquid portion and phosphate-containing solid portion are treated in the same manner as outlined in Fig. 1 for recombining purposes to provide a final improved plant food product. Acid treatment may be resorted to in connection with increasing the water solubility of the phosphate solids if desired. By removing the calcium subsequent to ammoniation and utilizing a washing step in connection with removal of "free" calcium from the solid phosphate portion, the calcium separation can advantageously be carried out under substantially reduced acidic conditions. This can be of particular importance in connection with the cost of equipment used.

Figure 3:
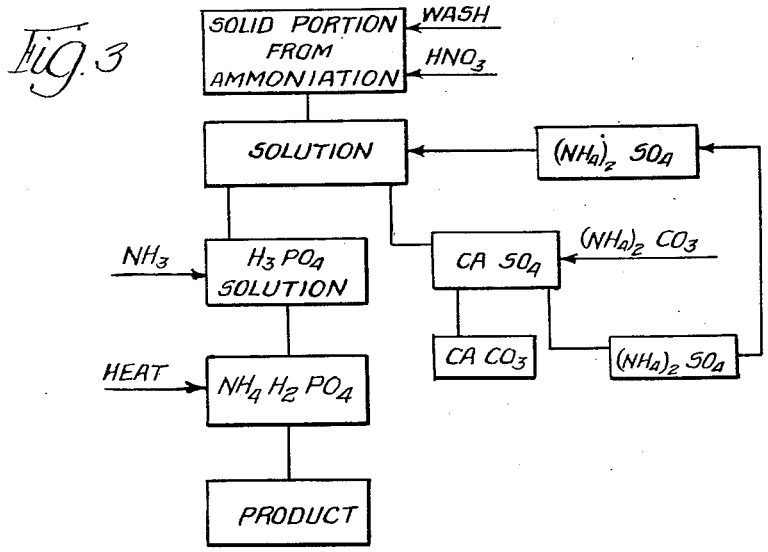
Fig. 3 is a diagrammatic flow sheet illustrating still another modified treatment forming a part of the present invention.

Still another modification in which the calcium may be fully removed from the constituents to thus completely eliminate the formation of hygroscopic salts is illustrated in Fig. 3. The initial digestion and potassium chloride treatments are carried out in line with steps previously described in connection with Figs. 1 and 2. The modified process illustrated in Fig. 3 commences with the separation of the solid phosphate-containing portion following ammoniation of the acid solution. The solid portion is first washed to reduce the "free" calcium components thereof and the remaining solids are then fully dissolved in nitric acid in line with the following reaction formula:

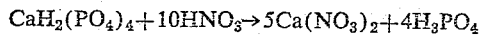

Complete dissolving of the calcium phosphate, which is illustrated in the foregoing formula is predominantly in the form of pentacalcium phosphate, calcium nitrate and phosphoric acid results. This solution is then treated with ammonium sulfate to remove the calcium in following with the reaction set forth in the following formula:

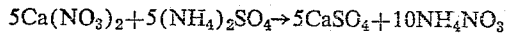

The solids, which are predominantly calcium sulfate, are separated and the remaining solution contains ammonium nitrate and phosphoric acid. Any calcium sulfate not removed will, of course, remain in solution. The solution described is then ammoniated as follows:

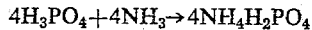

The remaining solution of ammonium nitrate and di- ammonium phosphate may then be evaporated to dryness which, on the basis of the given reaction formulas, will result in the provision of 12 moles of nitrogen to 2 moles of phosphate, or 1.4 parts by weight of nitrogen to 1 part of phosphate all of which is water soluble. The product formed in this manner can be marketed as a liquid without drying or dried and combined with various separated components obtained from following the procedures outlined in connection with Figs. 1 and 2 if desired. By following the process outlined, a product rich in di-ammonium phosphate or monoammonium phosphate can be obtained. The product is of increased water solubility while being relatively non-hygroscopic due to the complete absence of calcium salts.

As previously described and as illustrated by the various treatments discussed above, the removal of calcium to the extent desired substantially reduces the hygroscopicity of the final product. The phosphate constituent can be separated by ammoniation in solid form only where sufficient calcium remains to form an insoluble phosphate. Thus, considerable calcium content control and variation can be readily attained ranging from commercially efficient pentacalcium phosphate formation to calcium-free ammonium phosphate formation by following the specific procedures or variations of the same as set forth herein.

With nitric acid digestion of phosphate rock, the products heretofore have been excessively hygroscopic due at least in part to the presence of a considerable calcium chloride content. By exercising control of the amount of calcium present, the extent of the calcium chloride content can readily be reduced to any desired level. It has been found that where a considerable amount of calcium chloride is present in the plant food product, the hygroscopicity of the same is such that enough water is picked up to cause the product to become fluid. It has further been found that upon leaving the product under the same fluidizing conditions, it ultimately becomes solid again and subsequent to resolidifying is not again capable of liquefying. It is believed that this phenomena is due to displacement of the chlorine from the calcium chloride by carbon dioxide at the particular pH of the product resulting in the formation of calcium carbonate which, of course, is non-hygroscopic. It has been found that when samples of the product subjected to this phenomena are dissolved in acid there is an ebullition which presumably is due to the presence of carbon dioxide. Consequently, where there is an available supply of carbon dioxide, such as in the locality of a steel plant, it is possible to treat either the ammoniated slurry of the phosphate rock or the aqueous extract therefrom with carbon dioxide to form calcium carbonate to provide a final product of reduced hygroscopicity. Such a reaction can be carried out by drying the slurry by use of combustion gases rich in carbon dioxide.

The sulfating of the slurry portion or liquid portion of the rock solution either prior to or subsequent to ammoniation can readily be carried out on a desirable commercial basis. Advantageous economic use can be made of by-product ammonia and ammonia liquor resulting from the manufacture of coke in providing many of the treating agents necessary in carrying out the methods of the present invention. By-product ammonia can be used in the formation of nitric acid for digestion purposes as well as water solubility treatment. Ammonium carbonate available from ammonia liquor can be used in the converting of the calcium sulfate to ammonium sulfate for recycling purposes with the formation of by-product calcium carbonate. For the purpose of providing a replacement supply of ammonium sulfate, the ammonium carbonate obtained from ammonia liquor can be reacted with inexpensive gypsum such as is readily attainable. If carbon dioxide gas is available, the calcium sulfate removed during treatment of the rock solution may be treated with ammonia and carbon dioxide to reclaim the ammonium sulfate for recycling.

While the foregoing description sets forth various preferred methods of forming an improved plant food product utilizing nitric acid digestion, it will be understood that further variations and modifications in the procedures described may be made without departing from the spirit and scope of the present invention, and therefore only such limitations should be imposed as are indicated in the appended claims.

I claim:

1. In the preparation of a phosphate-containing plant food wherein the phosphatic component is obtained from the digestion of phosphate rock with an inorganic nitrogenous acid, the acid solution formed being treated with potassium chloride followed by fluorine-component precipitate removal and the fluorine free components being ammoniated to separate and recover the phosphate therefrom, the provision of a calcium component removal step subsequent to fluorine removal wherein a sulfating agent is introduced into the phosphate and calcium sulfate precipitate is removed therefrom to reduce the hygroscopicity of the phosphate product, and an acid treatment subsequent to ammoniation wherein an inorganic nitrogenous acid is added to the phosphate product to increase the water solubility of the phosphate product.

2. The treatment of phosphate rock and components thereof to obtain a calcium phosphate product of substantially reduced hygroscopicity, said treatment comprising digesting the phosphatic and acid-soluble components of said rock with an inorganic nitrogenous acid, adding to the acid solution formed a quantity of potassium chloride sufficient to precipitate the acid-soluble fluorine component from solution while being insufficient to promote the formation of a double silico-fluoride salt, removing the precipitate formed, adding additional potassium chloride to substantially increase the potash ratio of the acid solution, ammoniating the acid solution to form a solid portion of a calcium phosphate and a solution of salts, separating said solid portion from said solution, analyzing the solid portion and salt solution to determine the plant food values thereof, and recombining portions thereof on the basis of plant food components present to provide a plant food product which when dried supplies the desired weight ratio of nitrogen, phosphate and potash, the extent of formation of hygroscopic salts in said plant food product during said treatment being controlled by the addition of a sulfating agent thereto subsequent to fluorine component removal followed by calcium sulfate precipitate removal therefrom.

3. The treatment of phosphate rock and components thereof to obtain a calcium phosphate product of substantially reduced hygroscopicity and of increased water solubility, said treatment comprising digesting the phosphatic and acid-soluble components of said rock with an inorganic nitrogenous acid, adding to the acid solution formed a quantity of potassium chloride sufficient to precipitate the acid-soluble fluorine component from solution while being insufficient to promote the formation of a double silico-fluoride salt, removing the precipitate formed, adding additional potassium chloride to substantially increase the potash ratio of the acid solution, ammoniating the acid solution to form a solid portion of a calcium phosphate and a solution of salts, separating said solid portion from said solution, analyzing the solid portion and salt solution to determine the plant food values thereof, acid treating the solid portion to increase the water solubility thereof, and recombining portions thereof on the basis of plant food components present to provide a plant food product which when dried supplies the desired weight ratio of nitrogen, phosphate and potash, the extent of formation of hygroscopic salts in said plant food product during said treatment being controlled by the addition of a sulfating agent thereto subsequent to fluorine component removal followed by calcium sulfate precipitate removal therefrom.

4. The treatment of phosphate rock and components thereof to obtain a calcium phosphate product of substantially reduced hygroscopicity, said treatment comprising digesting the phosphatic and acid-soluble components of said rock with an inorganic nitrogenous acid, adding to the acid solution formed a quantity of potassium chloride sufficient to precipitate the acid-soluble fluoride component from solution while being insufficient to promote the formation of a double silica-fluoride salt, removing the precipitate formed adding additional potassium chloride to substantially increase the potash ratio of the acid solution, ammoniating the acid solution to form a solid portion of a calcium phosphate and a solution of salts, separating said solid portion from said solution, analyzing the solid portion and salt solution to determine the plant food values thereof, and recombining portions thereof on the basis of plant food components present to provide a plant food product which when dried supplies the desired weight ratio of nitrogen, phosphate and potash, the extent of formation of hygroscopic salts in said plant food product during said treatment being controlled by treating the fluorine free acid solution with ammonium sulfate prior to ammoniation thereof, removing the calcium sulfate precipitate formed, and further treating the salt solution with ammonium sulfate following separation of the salt solution from the solid portion subsequent to ammoniation of the acid solution, and removing the calcium sulfate precipitate formed.

5. The treatment of phosphate rock and components thereof to obtain a calcium phosphate product of substantially reduced hygroscopicity and of increased water solubility, said treatment comprising digesting the phosphatic and acid-soluble components of said rock with an inorganic nitrogenous acid, adding to the acid solution formed a quantity of potassium chloride sufficient to precipitate the acid-soluble fluorine component from solution while being insufficient to promote the formation of a double silico-fluoride salt, removing the precipitate formed, adding additional potassium chloride to substantially increase the potash ratio of the acid solution, ammoniating the acid solution to form a solid portion of a calcium phosplate and a solution of salts, separating said solid portion from said solution, analyzing the solid portion and salt solution to determine the plant food values thereof, acid treating the solid portion with an inorganic nitrogenous acid to increase the water solubility thereof, and recombining portions thereof on the basis of plant food components present to provide a plant food product which when dried supplies the desired weight ratio of nitrogen, phosphate and potash, the extent of formation of hygroscopic salts in said plant food product during said treatment being controlled by the addition of a sulfating agent thereto subsequent to fluorine component removal followed by calcium sulfate precipitate removal therefrom, the sulfating treatment being carried out to an extent to reduce the available calcium to at least substantially the dicalcium phosphate ratio.

6. The treatment of phosphate rock and components thereof to obtain a calcium phosphate product of substantially reduced hygroscopicity and of increased water solubility, said treatment comprising digesting the phosphatic and acid-soluble components of said rock with an inorganic nitrogenous acid, adding to the acid solution formed a quantity of potassium chloride sufficient to precipitate the acid-soluble fluorine component from solution while being insufficient to promote the formation of a double silico-fluoride salt, removing the precipitate formed, adding additional potassium chloride to substantially increase the potash ratio of the acid solution, ammoniating the acid solution to form a solid portion of a calcium phosphate and a solution of salts, separating said solid portion from said solution, analyzing the solid portion and salt solution to determine the plant food values thereof, acid treating the solid portion with an inorganic nitrogenous acid to increase the water solubility thereof, and recombining portions thereof on the basis of plant food components present to provide a plant food product which when dried supplies the desired weight ratio of nitrogen, phosphate and potash, the extent of formation of hygroscopic salts in said plant food product during said treatment being controlled by the addition of a sulfating agent thereto subsequent to fluorine component removal followed by calcium sulfate precipitate removal therefrom, the sulfating treatment being carried out to an extent to reduce the available calcium to at least substantially the dicalcium phosphate ratio, the calcium sulfate formed being treated with ammonia and carbon dioxide with the reclaiming of ammonium sulfate therefrom and a by-product of chalk, the reclaimed ammonium sulfate being recycled to said treatment.

7. The treatment of phosphate rock and components thereof to obtain a calcium phosphate product of substantially reduced hygroscopicity, said treatment comprising digesting the phosphatic and acid-soluble components of said rock with an inorganic nitrogenous acid, adding to the acid solution formed a quantity of potassium chloride sufficient to precipitate the acid-soluble fluorine component from said solution while being insufficient to promote the formation of a double silico-fluoride salt, removing the precipitate formed, adding additional potassium chloride to substantially increase the potash ratio of the acid solution, ammoniating the acid solution to form a solid portion of a calcium phosphate and a solution of salts, separating said solid portion from said solution, analyzing the solid portion and salt solution to determine the plant food values thereof, and recombining portions thereof on the basis of plant food components present to provide a plant food product which when dried supplies the desired weight ratio of nitrogen, phosphate and potash, the extent of formation of hygroscopic salts in said plant food product during said treatment being controlled by the addition of a sulfating agent thereto subsequent to fluorine component removal followed by calcium sulfate precipitate removal therefrom, the sulfating treatment being carried out to an extent to reduce the available calcium to at least substantially the pentacalcium phosphate ratio.

8. The treatment of phosphate rock and components thereof to obtain a calcium phosphate product of substantially reduced hygroscopicity, said treatment comprising digesting the phosphatic and acid-soluble components of said rock with an inorganic nitrogenous acid, adding to the acid solution formed a quantity of potassium chloride sufficient to precipitate the acid-soluble fluorine component from solution while being insufficient to promote the formation of a double silico-fluoride salt, removing the precipitate formed, adding additional potassium chloride to substantially increase the potash ratio of the acid solution, ammoninating the acid solution to form a solid portion of a calcium phosphate and a solution of salts, separating said solid portion from said solution, analyzing the solid portion and salt solution to determine the plant food values thereof, and recombining portions thereof on the basis of plant food components present to provide a plant food product which when dried supplies the desired weight ratio of nitrogen, phosphate and potash, the extent of formation of hygroscopic salts in said plant food product during said treatment being controlled by the addition of a sulfating agent thereto subsequent to fluorine component removal followed by calcium sulfate precipitate removal therefrom, the sulfating treatment being carried out to an extent to reduce the available calcium to at least substantially the pentacalcium phosphate ratio, the ammoniation having been carried out to approximately a pH of 5 to favor pentacalcium phosphate formation.

9. In the preparation of a phosphate-containing plant food wherein the phosphorous component is obtained from the digestion of phosphate rock with an inorganic nitrogenous acid, the acid solution formed being treated with potassium chloride followed by fluorine-component precipitate removal and the fluorine free components being ammoniated to separate and recover the phosphate therefrom in solid form, the provision of a calcium component removal step subsequent to ammoniation wherein the solid phosphate-containing portion is first washed and then re-dissolved with an inorganic nitrogenous acid, the acid solution is treated with ammonium sulfate, calcium precipitate is removed therefrom, the resulting solution is ammoniated, and the solids formed are dried.

10. In the preparation of a phosphate-containing plant food wherein the phosphorous component is obtained from the digestion of phosphate rock with an inorganic nitrogenous acid, the acid solution formed being treated with potassium chloride for fluorine followed by fluorine-component precipitate removal and the fluorine free components being ammoniated to separate and recover the phosphate therefrom in solid form, the provision of a calcium component removal step subsequent to ammoniation wherein the solid phosphate-containing portion is first washed and then re-dissolved with an inorganic nitrogenous acid, the acid solution is treated with ammonium sulfate to an extent to remove at least substantially all available calcium in precipitated form, the precipitate is removed, the resulting solution is ammoniated, and the solids formed are dried.

References Cited in the file of this patent

UNITED STATES PATENTS

| | | |
|---|---|---|
| 2,683,075 | Caldwell | July 6, 1954 |
| 2,783,140 | Hignett et al. | Feb. 26, 1957 |

UNITED STATES PATENT OFFICE
CERTIFICATE OF CORRECTION

Patent No. 2,942,967            June 28, 1960

Paul Caldwell

It is hereby certified that error appears in the printed specification of the above numbered patent requiring correction and that the said Letters Patent should read as corrected below.

Column 4, line 32, for "precipiate" read -- precipitate --; column 7, line 50, for "so extensive" read -- as extensive --; column 9, line 58, for that portion of the formula reading "$CaH_2(PO_4)_4$" read -- $Ca_5H_2(PO_4)_4$ --; column 12, line 9, for "fluoride" read -- fluorine --; lines 43 and 44, for "phosplate" read -- phosphate --.

Signed and sealed this 31st day of January 1961.

(SEAL)
Attest:

KARL H. AXLINE
Attesting Officer

ROBERT C. WATSON
Commissioner of Patents